United States Patent
Niehuss

Patent Number: 5,974,775
Date of Patent: Nov. 2, 1999

[54] MECHANISM FOR GARDEN AND HOUSEHOLD IMPLEMENTS AND THE LIKE

[75] Inventor: Barbara Niehuss, P.O. Box 236, Mexia, Ala. 36458

[73] Assignee: Barbara Niehuss, Mexia, Ala.

[21] Appl. No.: 08/918,837

[22] Filed: Aug. 26, 1997

[51] Int. Cl.⁶ ........................................................ A01D 7/00
[52] U.S. Cl. .......................................... 56/400.17; 294/58
[58] Field of Search ............................ 56/400.01, 400.17, 56/400.18, 400.19; 16/114 R, 110 R; 172/378, 371; 294/58, 57

[56] References Cited

U.S. PATENT DOCUMENTS

| | | | |
|---|---|---|---|
| 2,423,772 | 7/1947 | Haase | 56/400.17 |
| 2,536,607 | 1/1951 | Jenkins | 56/400.18 |
| 3,981,043 | 9/1976 | Curry | 16/110 R |
| 5,440,868 | 8/1995 | Darnell | 56/400.17 |
| 5,474,350 | 12/1995 | Gawthier | 294/58 |

Primary Examiner—Thomas B. Will
Assistant Examiner—Robert Pezzuto
Attorney, Agent, or Firm—Klehr, Harrison, Harvey, Branzburg & Ellers, LLP

[57] ABSTRACT

A frictionless household implement that includes a pole attached to a work piece that has a cylindrical slip handle for overlying the pole and facilitating frictionless lateral movement of the slip handle over the pole. The end of the pole opposite to the work piece is a rotational handle affixed transversely to the pole.

1 Claim, 1 Drawing Sheet

MECHANISM FOR GARDEN AND HOUSEHOLD IMPLEMENTS AND THE LIKE

FIELD OF THE INVENTION

The present invention is directed to an improved mechanism for facilitating the use of a rake. In particular, the present invention is directed to a novel system for facilitating the use of a rake and which minimizes the potential damage to the hands of the user caused by splinters and the like.

BACKGROUND OF THE INVENTION

Garden rakes and other implements have been utilized for thousands of years. Most garden rakes consist of a pole attached to a raking mechanism. It is often difficult to use such rakes because they frequently cause splinters, abrasions or callouses in the hands of the users due to friction between the hands of the user and the pole. Many persons are forced to use heavy and uncomfortable gloves.

A number of patents and devices have been disclosed in the prior art for improving raking mechanisms and in particular, the ease of use of such mechanisms. A first category of prior art rakes include lawn rake devices which have slidable handles to control secondary or multiple rake heads for gathering or picking up leaves and debris. Examples of these patents are Tolliver, U.S. Pat. No. 5,303,536, entitled "Rake With Debris Pile Capacity"; and U.S. Pat. No. 4,378,671, entitled "Rake". A second category of prior art patents includes rake devices which have slidable or rotatable mechanisms which permit the user to adjust the width or swath of a rake head by a time guide or tine stabilizer. Several of these devices also use the stabilizer as a self-cleaning mechanism for the rake. Examples of this category include McLeod, U.S. Pat. No. 4,901,515 and Huspen, U.S. Pat. No. 3,750,379.

A final category of prior art patents discloses the use of handles attached to garden tools to extend the reach of the tool or to provide additional leverage for lifting or pushing the garden tool. Examples of this category include Auernhammer, U.S. Pat. No. 4,197,764 and Davidson, U.S. Pat. No. 4,050,728.

Neither Auernhammer nor Davidson patents describe the use of rotatable or slidable handle on a garden tool. The purpose of the Auernhammer assembly is to allow a hedge clipper to be used for cutting lawn weeds at ground level. The Davidson invention is attached to a shovel or garden tool through a universal joint and simply provides a secondary leverage point for lifting, pushing or pulling the garden tool. None of the prior art devices disclose a rake or implement handle system which minimizes hand friction and wear.

It would be desirable to provide a garden rake which would facilitate the use of a rake by providing slidable and rotatable handles. The rake could therefore be used without undo friction or splinters on the hands of the user. The concepts of the present invention are equally applicable to numerous other garden and household implements such as brooms, mops, squeegees, hoes and the like. These and other objects of the present invention, become apparent from the following summary and detailed description which follow.

SUMMARY OF THE INVENTION

In accordance with the present invention, an improved rake mechanism is disclosed. The invention includes a pole and plurality of prongs; a slip handle for overlying said pole for facilitating the movement of the user with respect to the handle; and a rotational handle affixed transversely to an opposite end of the pose for facilitating the traverse rotation of a pole and the use of the rake.

In a more preferred embodiment, the present invention is directed to an improved rake handle comprising a handle having a first end and a second end, said second end being attached to a rake head; a sliding handle sleeve situated between first and second ends of said handle and a rotatable handle affixed to the first end of the handle and rotatable transverse to the axis of the handle for facilitating the ease of use of the rake. It is to be noted that the present invention is equally applicable to a wide variety of garden and household implement.

These and other objects of the present invention are set forth in the following detailed description and the claims appended hereto.

DETAILED DESCRIPTION OF THE PREFERRED EMBODIMENT

Figure 1:
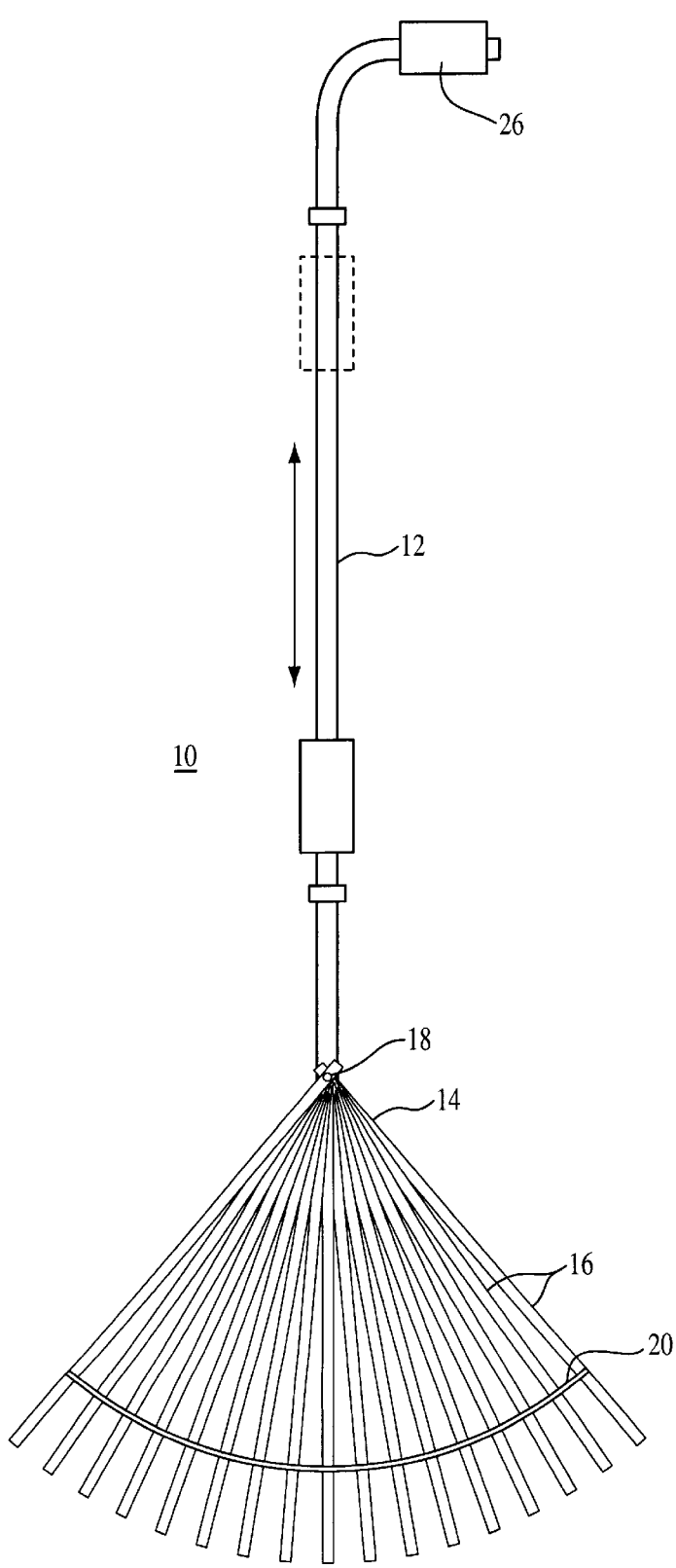
FIG. 1 is an elevational view of an improved rake handle in accordance with the present invention.
Figure 2:
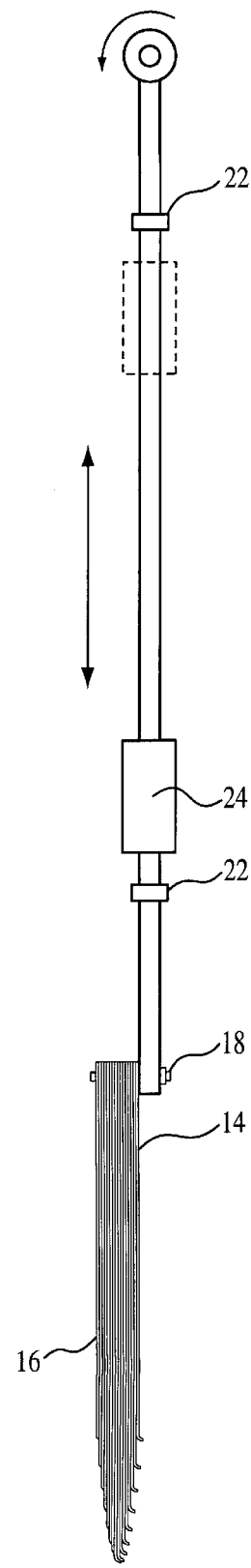
FIG. 2 is a side perspective view of the improved rake handle in accordance with the present invention.

The present invention is described with reference to the enclosed Figures wherein the same numbers are used applicable. Referring to FIG. 1, the mechanism 10 of the present invention is shown. The mechanism 10 of the present invention, in one embodiment, is a garden or household implement such as a rake comprising a handle 12 affixed to rake 14. It is to be appreciated that the teachings of the present invention are applicable to a wide variety of garden and household implements such as brooms, mops, hoes, squeegees and the like.

In the preferred embodiment rake 14 is conventional and comprises a plurality of tines 16 which fan our from a centralized location 18 are held by a support member 20.

The handle includes two stop mechanisms 22 separated by a longitudinal portion 12a of the handle 12. A slidable sleeve or slip handle 24 moves between the two stop mechanisms 22. In operation the user of the rake holds the slip handle and operates the rake. The slip handle facilitates the use of the rake between the two stop points, and eliminates friction and damage to the user's hands. The slidable sleeve or slip handle 24 is preferably cylindrical in shape.

The other end of the handle 12 includes a rotating roller 26 which extends perpendicular to the handle. The user of the device holds this roller thereby eliminating friction.

The operation of the present invention is now described. The use of the household implement is accomplished by grabbing slip handle 24 and roller 26. As the implement is used in its normal way, slip handle 24 slides up and down the handle between stop mechanisms 22 (see arrow). The handle 26 also rotates. The user thereby avoids friction and splinters during usage.

The present invention has been described with reference to the enclosed Figures. It is to be appreciated that other embodiments fulfill the spirit and scope of the present invention and that the true nature and scope of the present invention is to be determined with reference to the claims appended hereto.

What is claimed is:

1. A household implement to be used by a user comprising;

a pole attached at one end to a work piece;

a freely movable cylindrical slip handle for overlying said pole for facilitating the lateral movement of the pole with respect to first hand of the user of the implement; and a freely rotatable handle affixed transversely to the end of the pole opposite the work piece for facilitating the rotation of the pole with respect to the second hand of the user of the implement.

* * * * *